(12) United States Patent
Stiebitz et al.

(10) Patent No.: US 8,480,342 B2
(45) Date of Patent: *Jul. 9, 2013

(54) SCREW

(75) Inventors: Guenter Stiebitz, Waldenburg (DE);
Uwe Wolfarth, Schrozberg (DE)

(73) Assignees: Wuerth International AG part interest, Chur (CH); SWG Schraubenwerk Gaisbach GmbH part interest, Waldenburg (DE)

( * ) Notice: Subject to any disclaimer, the term of this patent is extended or adjusted under 35 U.S.C. 154(b) by 856 days.

This patent is subject to a terminal disclaimer.

(21) Appl. No.: 12/120,947

(22) Filed: May 15, 2008

(65) Prior Publication Data

US 2008/0286072 A1    Nov. 20, 2008

(30) Foreign Application Priority Data

May 18, 2007   (DE) .......................... 10 2007 024 240

(51) Int. Cl.
*F16B 25/00*   (2006.01)

(52) U.S. Cl.
USPC .......................................... 411/386; 411/413

(58) Field of Classification Search
USPC ................ 411/386–387.5, 311, 413, 412
See application file for complete search history.

(56) References Cited

U.S. PATENT DOCUMENTS

| | | | |
|---|---|---|---|
| 2,263,137 A | | 11/1941 | Oestereicher |
| 4,323,326 A | * | 4/1982 | Okada et al. .................. 411/412 |
| 5,133,630 A | * | 7/1992 | Hughes ......................... 411/82.5 |
| 5,273,383 A | * | 12/1993 | Hughes .......................... 411/311 |
| 5,358,366 A | * | 10/1994 | Suzuki ........................... 411/311 |
| 6,328,516 B1 | * | 12/2001 | Hettich ....................... 411/387.2 |
| 7,862,279 B2 | * | 1/2011 | Stiebitz et al. ............. 411/387.1 |
| 2005/0069396 A1 | | 3/2005 | Wu |

FOREIGN PATENT DOCUMENTS

| | | |
|---|---|---|
| DE | 52742 C | 8/1889 |
| DE | 83 26 144.3 | 9/1983 |
| DE | 195 25 732 A1 | 1/1997 |
| DE | 202 16 249 U1 | 1/2003 |
| EP | 0 761 992 A1 | 8/1996 |
| EP | 0 939 235 A1 | 2/1999 |
| EP | 1 411 252 A2 | 7/2003 |
| EP | 192 5828 A2 | 5/2008 |

* cited by examiner

*Primary Examiner* — Flemming Saether

(74) *Attorney, Agent, or Firm* — Boyle Fredrickson, S.C.

(57) ABSTRACT

The invention concerns a screw, in particular a self-tapping screw, with a screw thread which reaches to the front end of the screw formed as a drilling tip. In the front area, starting with a distance from the front end of the screw, there is an opposite thread showing the same pitch as the screw thread, however, its thread height is lower than the thread height of the screw thread. This second, opposite single-thread, double-thread or triple-thread/multi-thread only reaches over the tapered drilling tip and leaves the shank of the screw free. It forms a cutting edge with its thread edge which is used to cut fibers in order to reduce wedge effect during screwing in the screw. The screw is particularly suitable for wood or wood-like materials in the edge areas of structural elements.

9 Claims, 2 Drawing Sheets

6a
7a

6b

7b 6c
7c 7a
6a

6b

7b 6c
7c

SCREW

The invention concerns a screw, in particular a self-tapping screw.

It is known that serrations which usually run in the longitudinal direction i.e. crosswise to the movement of the screw tip as compared with the wood are arranged on the tip of the screw to make threading screws into wood or wood-like material easier. These serrations are also intended to reduce the risk of splits or splintering.

In a known screw of this type (DE 19525732), the serrations of a conical screw tip are in one forming the cone, in other words they run in a longitudinal centre plane contained in the longitudinal axis of the screw.

A screw (EP 939235 A1) is also known where several serrations are arranged diagonally and in fact at an inclination angle compared to the longitudinal axis in a range of approximately 15°.

The underlying task of the invention is to create a screw, in particular a self-tapping screw, with improved threading characteristics in particular with regard to the splitting of wood during the screwing in.

To solve this task, the present invention proposes a screw with the characteristics mentioned in Claim 1. Further embodiments of the present invention are subject of the subclaims.

The opposite pitch thread which only covers the tip of the screw creates a particularly advantageous possibility to prevent a split effect while making the hole into which the screw is then threaded so that the screw can also be used in the edge area of wood without the risk that the fiber of the wood splits open there and thus that the screw can no longer be thoroughly tightened. Since the splitting effect is caused by the enlarging tip of the screw, the cutting thread also only needs to be arranged in this area.

It has been found to be particularly expedient to form the cutting thread so that it covers at least one, in particular two or also three windings so that in this manner a continuous cutting edge interrupted if necessary by the screw thread is also produced for at least one turn.

In an embodiment of the present invention, the thread height of the cutting thread can be selected so that it is between 0.2 mm and maximum the thread height of the screw thread. Since the thread height is dependent on the size of the screw, the cutting thread therefore also takes account of the size of the screw.

It is particularly expedient if the cutting edge does not begin directly at the front pointed end of the screw tip. It is thus ensured that initially the screw thread up to the front end engages in the wood in order to produce the advance. It can be provided according to the present invention that the thread height of the cutting thread remains constant from its front area assigned to the screw tip to its end. This particularly applies if the thread height of the cutting thread is less than the thread height of the screw thread.

It is, however, also possible and within the scope of the invention that the thread height of the cutting thread reduces from its beginning assigned to the screw thread up to the opposite end, for example tapers continuously.

Depending on the application case, it can also be beneficial if the thread height of the cutting thread increases from the tip to the shank.

In an embodiment according to the invention it can be provided that the pitch of the cutting thread is less than or equal to the thread pitch of the screw thread.

It has proven to be particularly expedient to make the thread pitch of the cutting thread the same as the thread pitch of the screw thread. This symmetrical geometry of both the threads has emerged as the best embodiment. As regards screwing the screw into the wood, optimum paring in relation to the drive is produced. As concerns the manufacture of the screw by reshaping, the optimum structure is achieved by cold rolling.

The screw thread can be a chipboard thread or a wood thread. It can be single-thread or multiple-thread. Accordingly, the cutting thread can also be single-thread or multiple-thread.

The tip of the screw can be a drilling tip whereby the tip of the screw is formed conically with screw thread up to the tip.

The screw proposed by the present invention is not only suitable for wood or wood-like material but also for use as a sheet-metal tapping screw.

Further characteristics, details and advantages of the present invention arise from the Claims and the Summary where the wording of both makes reference to the content of the Description, the following description of preferred embodiments of the present invention and using the drawings.

Figure 1:
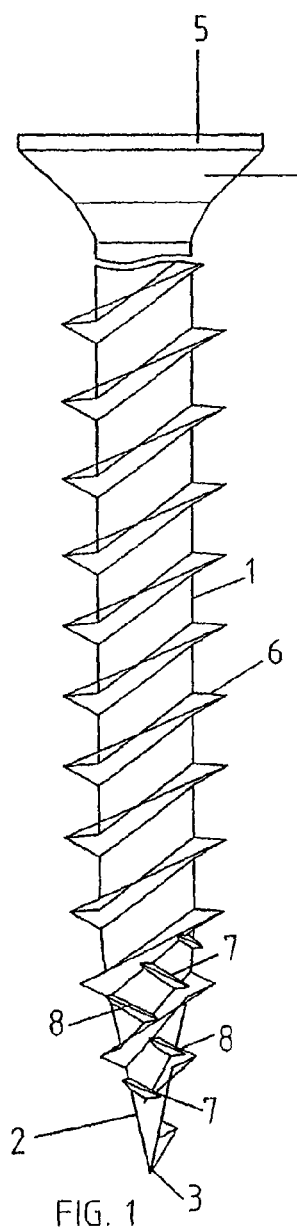
FIG. 1 is a side view of an embodiment of a screw according to the present invention.
Figure 2:
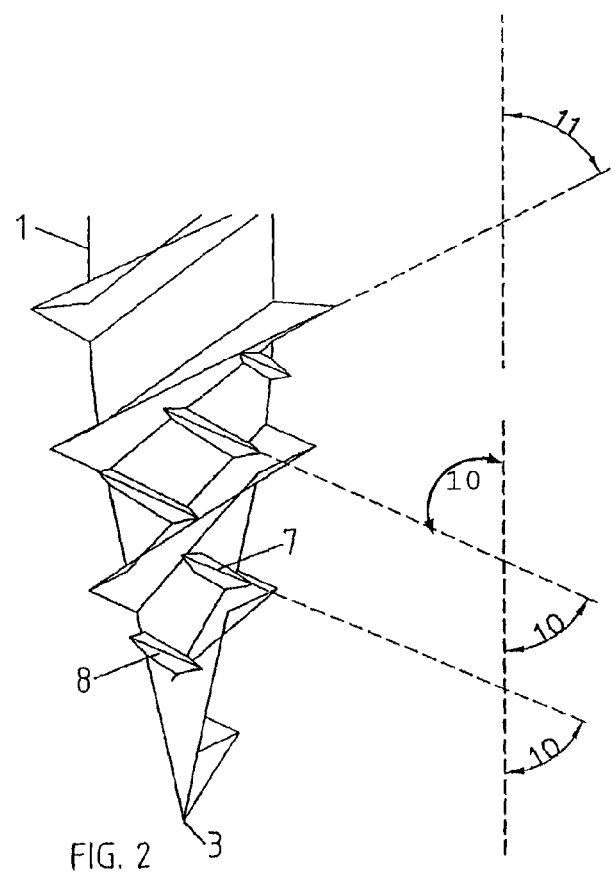
FIG. 2 is an enlarged detail view of the front end of the screw of FIG. 1.

The screw shown in FIGS. 1 and 2 has a cylindrical screw shaft 1 transitions into a screw tip 2 at its bottom end in FIG. 1. In the embodiment shown in FIG. 1, the screw tip 2 shows a conical form with a sharp tip 3. The taper angle is approximately 30°. There is a screw head 4 at the opposite end, a countersunk head in the example shown. A screw driving recess is in the flat end 5 of the screw head 4 shown in the example which is used for turning the screw with a corresponding tool.

A screw thread 6 is formed on the screw shaft 1 which is manufactured for example by rolling. This is a double thread in the example shown. This thread 6 in the embodiment shown in FIG. 1 ranges up to the sharp tip 3 of the screw tip 2.

At the same time there is an opposite thread 7 in the front area which starts approximately at half the length of the conical form of the screw tip 2 and covers approximately two windings. This double thread 7 also forms a thread edge 8 which is designed as and acts as a cutting edge. It can be seen in FIG. 1 that this opposite cutting thread 7 shows the same thread pitch as the screw thread 6. Its thread height, i.e. the distance of its cutting edge from the surface of the screw shaft 1, is about half of the thread height of the screw thread 6.

The type and arrangement of the thread turns of the cutting thread 7 are shown magnified In FIG. 2. For the example shown in the drawing, the angle 10 between the cutting edge 8 of the cutting thread 7 and the longitudinal axis of the screw is approximately 60° to 65° as is also the angle 11 between the thread 6 and the longitudinal axis of the screw. As both the threads show different orientation, the angles are also shown at different places in the drawing. It can also be seen from FIG. 2 that both the cutting thread 7 as well as the screw thread 6 are formed as double threads.

The size of this angle between the spiral windings and the longitudinal axis of the screw is of course dependent on the number of windings of the thread per length unit of the screw. It can of course also take on different angles depending on the diameters and the desired pitches.

The maximum radius of the cutting thread 7, i.e. the maximum distance of the cutting edge 8 from the longitudinal axis of the screw, is somewhat larger than the radius of the core of the screw shank 1. This maximum radius only exists at the last winding as seen from the tip 3 of the cutting thread 7 in its last area.

Figure 3:
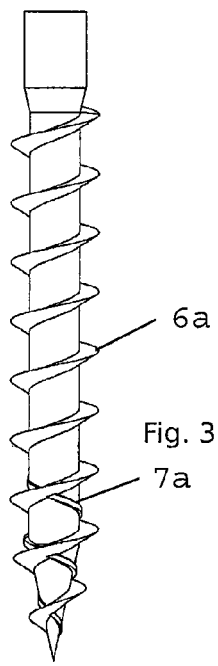
FIG. 3 is a side view of a screw in which the thread height of the cutting thread reduces.
Figure 5:
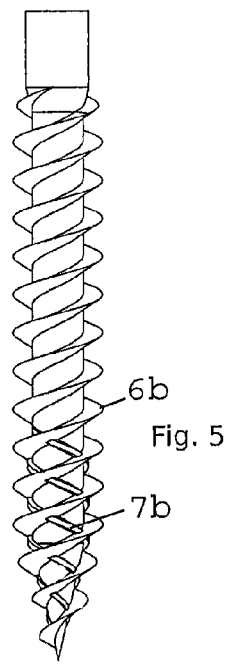
FIG. 5 is a side view of a screw in which the screw thread is a double thread.
Figure 7:
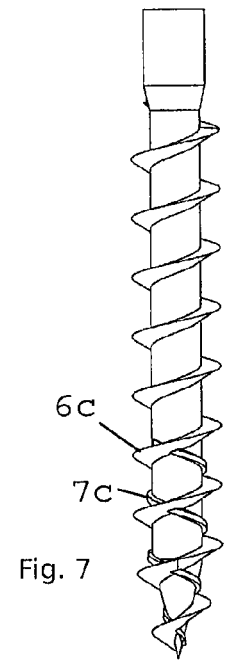
FIG. 7 is a side view of a screw with a cutting thread with constant thread height.
Figure 4:
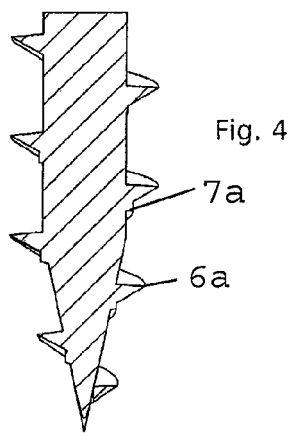
FIG. 4 is a sectional view of the screw tip of the embodiment of FIG. 3.
Figure 6:
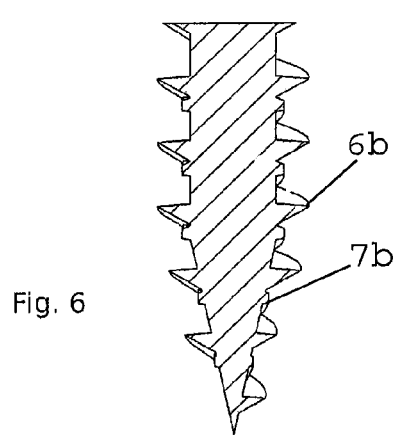
FIG. 6 is a sectional view of the screw tip of the embodiment of FIG. 5.
Figure 8:
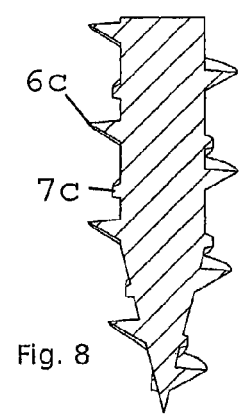
FIG. 8 is a sectional view of the screw tip of the embodiment of FIG. 7.

FIGS. 3 and 4 illustrate an embodiment in which the thread height of the cutting thread 7a reduces continuously as it approaches the screw tip, but the height of the screw thread 6a is constant, while FIGS. 7 and 8 illustrate an embodiment in which the cutting thread 7c is provided with a constant thread height. FIGS. 5 and 6 show an embodiment with a double screw thread 6b and a cutting thread 7b.

The invention claimed is:

1. Screw, which comprises a self-tapping screw, with a screw head, a screw shaft having a longitudinal screw axis, a screw tip, a screw thread, as well as a cutting thread formed at a cutting thread pitch angle disposed in an opposite direction from a screw thread pitch angle of the screw thread relative to the screw axis, the cutting thread including a cutting edge which starts at a distance from a front end of the screw and only covers a tip portion of the screw; and in which the cutting thread includes a plurality of transverse portions extending between turns of the screw thread, the transverse portions of the cutting thread being spaced apart and spaced around at least one complete turn of the screw shaft, said transverse portions being interrupted at most by one turn of the screw thread.

2. Screw according to claim 1, in which the thread height of the cutting thread remains constant in a direction from the front end of the screw to the screw head.

3. Screw according to claim 1, in which the thread height of the cutting thread reduces starting from the front end of the screw and continuing in the direction toward the screw head.

4. Screw according to claim 1, in which the thread pitch of the cutting thread is equal to the thread pitch of the screw thread.

5. Screw according to claim 1, in which the screw thread is a single thread.

6. Screw according to claim 1, in which the screw thread is a multiple thread.

7. Screw according to claim 1, in which the tip of the screw is a drilling tip with the tip of the screw formed conically with a screw thread to the tip.

8. Screw according to claim 1, wherein the pitch angle of the cutting thread and the pitch angle of the screw thread are both in a range from sixty degrees to sixty-five degrees with respect to the screw axis.

9. Screw according to claim 1, in which the cutting thread comprises from two to three windings on the screw shaft;

in which the thread height of the cutting thread is in a range between 0.2 mm and the thread height of the screw thread from a surface of the screw shaft; and in which the cutting thread pitch angle of the cutting thread is less than or equal to the screw thread pitch angle of the screw thread.

* * * * *